May 3, 1960 W. P. CRAWFORD 2,935,367
CONVEYOR TYPE STORAGE CABINET
Filed Jan. 29, 1958 2 Sheets-Sheet 1
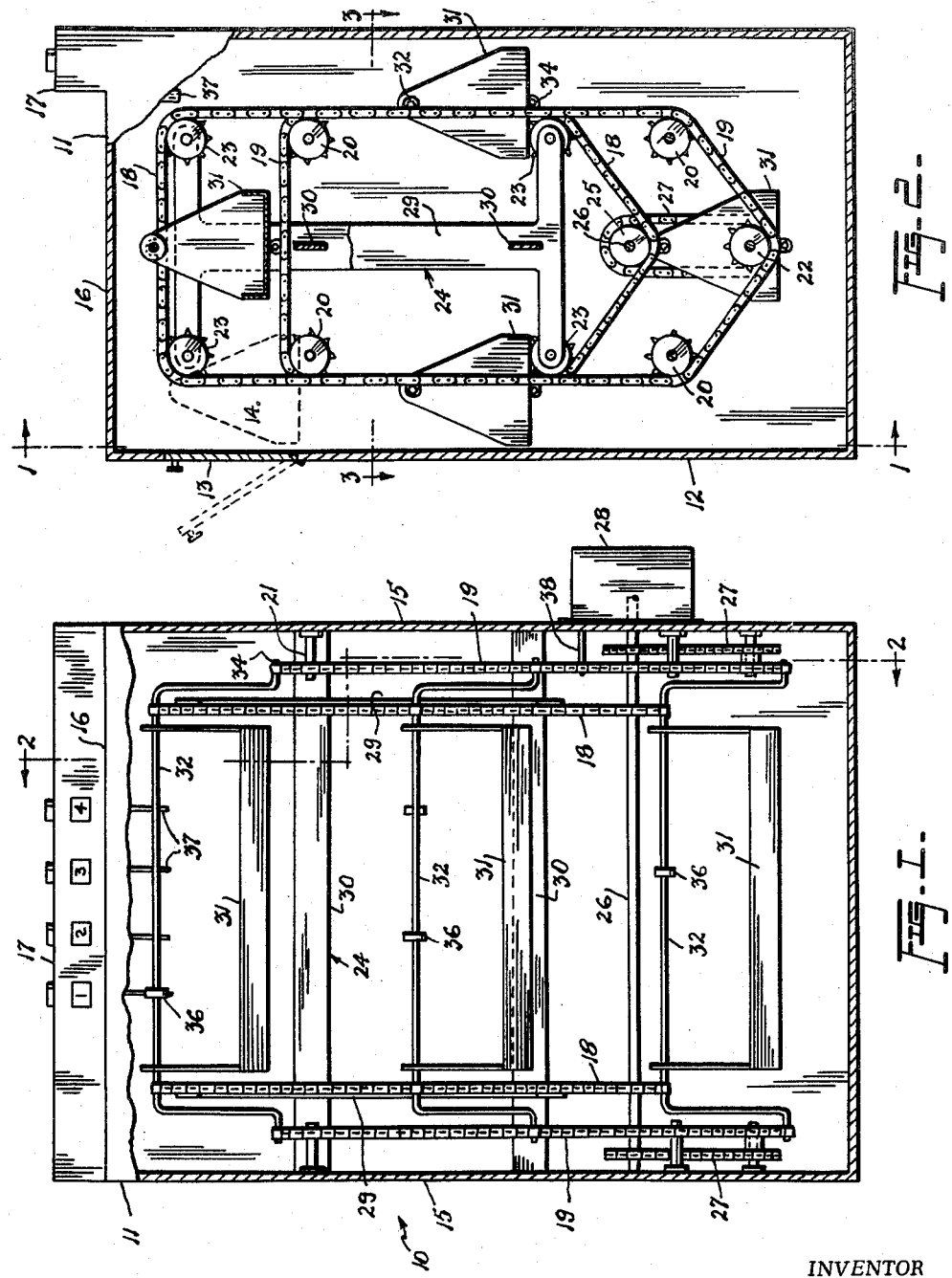
INVENTOR
Wayne P. Crawford
BY
ATTORNEY May 3, 1960 W. P. CRAWFORD 2,935,367
CONVEYOR TYPE STORAGE CABINET
Filed Jan. 29, 1958 2 Sheets-Sheet 2
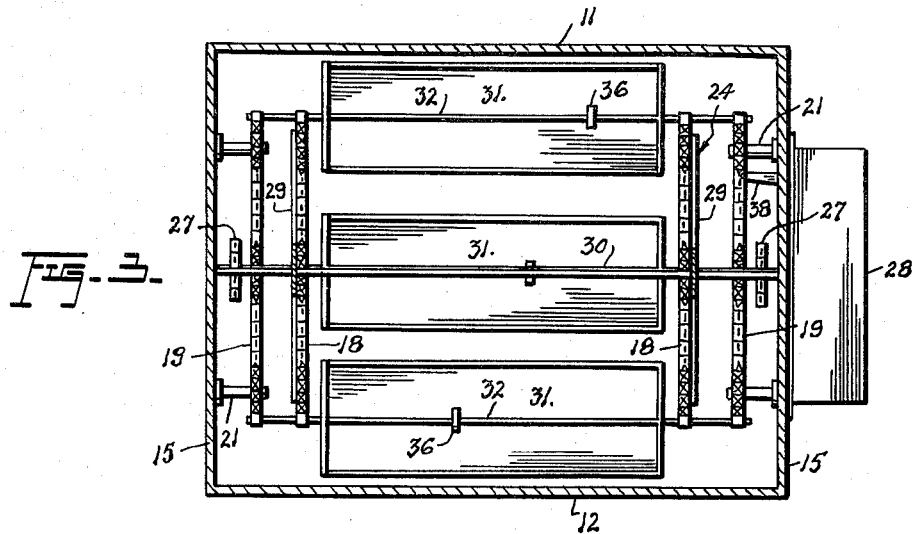
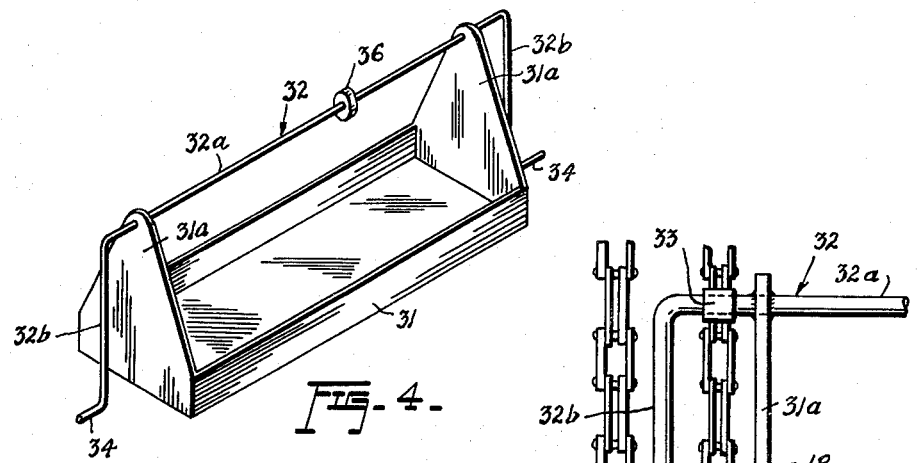
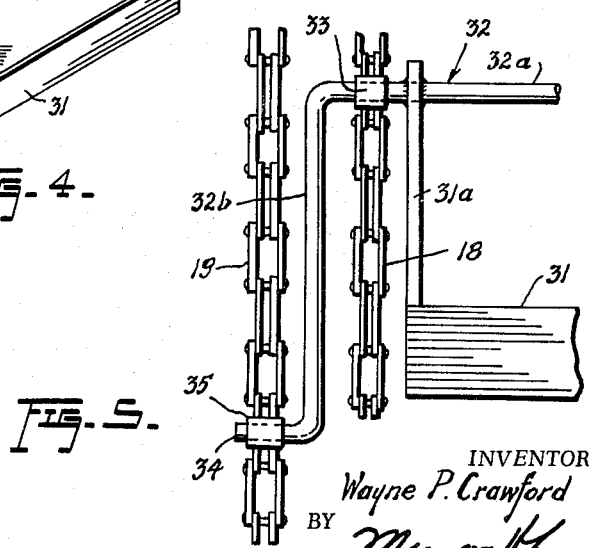
INVENTOR.
Wayne P. Crawford
BY
ATTORNEY

# United States Patent Office 2,935,367
Patented May 3, 1960

2,935,367

CONVEYOR TYPE STORAGE CABINET

Wayne P. Crawford, Hamilton, Ohio

Application January 29, 1958, Serial No. 711,828

1 Claim. (Cl. 312—268)

This invention relates to new and useful improvements in storage cabinets, particularly storage cabinets wherein a plurality of trays, or the like, are movably supported by endless chains so that they may be brought selectively and successively in register with a loading and unloading station.

As such, the instant invention primarily concerns itself with certain improvements in the apparatus disclosed in my co-pending application Serial No. 531,727, filed August 31, 1955, of which application this is a continuation-in-part and which has now matured into Patent No. 2,829,024, issued on April 1, 1958.

The invention disclosed in my earlier application embodies trays arranged in juxtaposed pairs supported between a center chain and a pair of side chains by a three-point suspension means comprising a single point of suspension for each pair of trays on the center chain and two points of suspension on the respective side chains.

The instant invention has as its primary object certain improvements in the tray suspension means, specifically, an arrangement whereby individual trays are supported by a four-point suspension means from inner and outer pairs of chains disposed at the ends of the trays, each tray having two points of suspension on the inner pair of chains and two points of suspension on the outer pair, whereby the trays are movably supported and prevented from swinging or rocking on their points of suspension.

Other objects and features of the instant invention will become apparent from the following description taken in conjunction with the accompanying drawings, wherein like characters of reference are employed to designate like parts, and wherein for illustrative purposes:

Figure 1 is a front elevational view of the instant invention with the front wall of the cabinet removed to reveal the interior, this view being taken substantially in the plane of the line 1—1 in Figure 2;

Figure 2 is a vertical sectional view, taken substantially in the plane of the line 2—2 in Figure 1;

Figure 3 is a horizontal sectional view, taken substantially in the plane of the line 3—3 in Figure 2;

Figure 4 is an isometric view of one of the trays with its supporting hanger; and Figure 5 is a fragmentary elevational view, on an enlarged scale, showing a portion of the tray, hanger and supporting chains.

Referring now to the accompanying drawings in detail, the conveyor type storage cabinet in accordance with the present invention is designated generally by the reference numeral 10 and embodies in its construction a suitable housing 11 having a front wall 12 provided adjacent the top thereof with a suitable door 13 for gaining access to a loading and unloading station 14 in the front upper portion of the housing. The latter also includes a pair of side walls 15 and a top wall 16 provided with a control mechanism 17, hereinafter again to be mentioned.

A pair of inner endless chains 18 and a pair of outer endless chains 19 are disposed in transversely spaced, vertical planes in the housing 11, the upper and lower runs of the inner chains being spaced upwardly from the respective upper and lower runs of the outer chains, as is clearly shown in Figures 1 and 2.

The outer chains 19 are entrained over suitable idler sprockets 20 mounted on stub shafts 21 provided on the side walls 15 of the housing, and the lower runs of these chains also pass around drive sprockets 22. The inner chains 18 are entrained over idler sprockets 23 carried by a sub-frame 24 hereinafter described, and the lower runs of the inner chains also pass around drive sprockets 25 secured to a drive shaft 26 which extends transversely of and is rotatably journalled in the housing side walls 15. Suitable endless chain drives 27 operatively connect the drive sprockets 22 to the drive shaft 26, whereby the chains 18, 19 are driven in unison.

The shaft 26 is driven through a suitable reduction gearing by a motor (not shown) contained in a casing 28 on one of the side walls 15, as disclosed in my earlier application.

The aforementioned sub-frame 24 comprises a pair of transversely spaced side members 29 which are substantially I-shaped in form and have the idler sprockets 23 rotatably mounted at the ends of their arms, as shown in Figure 2. The members 29 are secured together by suitable cross-pieces 30 which project beyond the members 29 and are secured to the side walls 15 of the housing, whereby the sub-frame 24 is supported in the housing solely by the side walls 15 of the latter.

It is to be noted that the sub-frame 24 is encompassed by the paths of travel of the chains 18, 19 and does not interfere with the movement of a set of trays 31 carried by the chains. These trays, which may be of any suitable size, shape, configuration and structure, are disposed between the inner pair of chains 18 and are movably supported on the chains by suspension means hereinafter described, so that the individual trays may be brought successively and selectively in register with the loading and unloading station 14 for the purpose of placing articles therein and removing the same therefrom, as desired, through the door 13.

Each of the trays 31 is supported by a substantially U-shaped, inverted hanger 32 which has its bight portion 32a extending through and rigidly secured, such as by welding, or the like, to upstanding side or end plates 31a with which the tray is provided, the bight portion 32a of the hinger also being rotatably journalled in bearings 33 provided at spaced points along the inner chains 18, as is best shown in Figure 5.

The arms 32b of the hanger 32 are provided with outturned trunnions 34 which are rotatably journalled in bearings 35 provided at spaced points along the outer chains 19, it being apparent from the foregoing that each tray is supported by its hanger through a four-point suspension means from the two pairs of chains, two points of such suspension being at the bearings 33 on the inner chains and the other two points at the bearings 35 on the outer chains.

The trunnions 34 are spaced or offset from the bight portion 32a by a distance equal to the vertical spacing of the respective upper and lower runs of the chains 18, 19, and thus the hangers 32 support the trays in such manner that the trays are prevented from swinging or rocking about their points of suspension.

As in the invention disclosed in my earlier application, any number of trays may be provided on the chains, and the cabinet housing may be lengthened vertically so as to accommodate the same.

The aforementioned control mechanism 17 is the same as that in my earlier invention, whereby the operating means in the casing 28 may be energized so as to selectively and successively bring the several trays into register with the station 14. For simplicity of illustration, the control mechanism has not been shown in detail, apart from contact members 36 which are provided on the bight portions 32a of the hangers 32 and are operatively engageable with control members 37 of the control mechanism.

The coaction of the members 36, 37 and the effecting of control by the members 37 is the same as in my earlier invention, and further description thereof at this point is believed unnecessary. Also in accordance with my earlier application, the instant device may be provided with means 38, actuated by mechanism in the casing 28, for automatically locking the chains against movement when any one of the trays 31 is at the station 14.

Thus, while in the foregoing there has been described and shown the preferred embodiment of the present invention, various modifications may become apparent to those skilled in the art to which the invention relates. Accordingly, it is not desired to limit the invention to this disclosure and various modifications may be resorted to, such as may lie within the spirit and scope of the appended claim.

What is claimed as new is:

In a conveyor type storage cabinet, the combination of a housing including a pair of side walls, an outer set of sprockets rotatably mounted on said side walls, an outer pair of endless chains entrained on said outer set of sprockets and disposed in vertical planes, a sub-frame provided in said housing and supported solely by said side walls, said sub-frame including a pair of side members spaced inwardly from said side walls and a plurality of cross pieces connecting said side members together, said cross pieces projecting beyond the side members and being secured to said side walls whereby to provide sole means for supporting said sub-frame in said housing, an inner set of sprockets rotatably mounted on the side members of said sub-frame, an inner pair of endless chains entrained on said inner set of sprockets and disposed in vertical planes spaced inwardly from said outer chains, the inner chains having upper and lower runs spaced vertically from the respective upper and lower runs of the outer chains, a plurality of inverted U-shaped hangers each formed from a single angulated rod and including a bight portion extending between and rotatably attached to said inner chains, a pair of downwardly extending side arms at the ends of said bight portion and a pair of coaxial trunnion members provided at the lower ends of the respective side arms and rotatably connected to the respective outer chains, the bight portion of each hanger being parallel with and spaced from said trunnions by a distance equal to the length of said side arms and to the vertical spacing of said runs of chains, a plurality of trays rigidly secured to the bight portions of the respective hangers and disposed between the inner chains, a drive shaft extending transversely in said housing and driving sprockets of said inner chains, and means disposed between the outer chains and said side walls for operatively connecting sprockets of the outer chains to said drive shaft whereby both said inner and outer chains are simultaneously and positively driven by said drive shaft.

References Cited in the file of this patent
UNITED STATES PATENTS

| | | |
|---|---|---|
| 864,438 | Szczy | Aug. 27, 1907 |
| 1,691,186 | Greth | Nov. 13, 1928 |
| 2,242,813 | Cook | May 20, 1941 |